United States Patent [19]

Benson et al.

[11] Patent Number: 5,681,499

[45] Date of Patent: Oct. 28, 1997

[54] METHOD AND COMPOSITIONS FOR MAKING REFRACTORY SHAPES HAVING DENSE, CARBON FREE SURFACES AND SHAPES MADE THEREFROM

[75] Inventors: Paul M. Benson, McDonald; Duane L. DeBastiani; Quentin K. Robinson, both of Pittsburgh, all of Pa.; David Stephenson, Troon, Scotland; Phillipe Dumas, Feignies, France; Eric Hanse, Dour-Elouges, Belgium

[73] Assignee: Vesuvius Crucible Company, Wilmington, Del.

[21] Appl. No.: 548,764

[22] Filed: Oct. 26, 1995

Related U.S. Application Data

[63] Continuation-in-part of Ser. No. 490,792, Jun. 15, 1995.

[51] Int. Cl.⁶ ............................................. B22D 41/54
[52] U.S. Cl. ................... 222/606; 222/591; 222/590; 266/236; 501/100
[58] Field of Search .................. 266/236, 45; 222/591, 222/597, 600, 606, 607, 590; 501/99, 100, 133

[56] References Cited

U.S. PATENT DOCUMENTS

| | | | |
|---|---|---|---|
| 4,682,718 | 7/1987 | Wanatabe et al. | 222/606 |
| 5,198,126 | 3/1993 | Lee | 222/606 |
| 5,348,202 | 9/1994 | Lee | 222/606 |
| 5,348,203 | 9/1994 | Andoh et al. | 222/606 |
| 5,370,370 | 12/1994 | Benson | 222/606 |

FOREIGN PATENT DOCUMENTS

| | | |
|---|---|---|
| 0198925 | 10/1986 | European Pat. Off. . |
| 0423793 | 4/1991 | European Pat. Off. . |
| 0503316 | 9/1992 | European Pat. Off. . |
| 2316027 | 1/1977 | France . |
| 3805334 | 8/1989 | Germany . |
| 4100352 | 7/1991 | Germany . |
| 5154627 | 6/1993 | Japan . |
| 5154628 | 6/1993 | Japan . |
| 75140 | 1/1978 | Luxembourg . |

*Primary Examiner*—Scott Kastler
*Attorney, Agent, or Firm*—Webb Ziesenheim Bruening Logsdon Orkin & Hanson, P.C.

[57] ABSTRACT

A dense carbon free surface is provided on a carbon bonded refractory shape which is particularly useful as a pouring tube liner to prevent the formation and build-up of alumina particles which may cause blockage of the tube. The carbon free, dense layer is also hard and erosion resistant making it ideal for use in other applications such as stopper rod noses. The material comprises a refractory mix having a major component of refractory oxides such as alumina and zirconia-mullite. Less than 10 wt. % carbon in the form of graphite and binder is in the mix plus about 2–5 wt. % of a metal such as silicon and an effective mount of sintering aids is also present. The pressed shape is preheated to a temperature of 1000°–1400° C. in air to oxidize the exposed surface of the shape and then to sinter the oxidized surface to form the desired dense, carbon free surface over the entire shape or on selected surface portions thereof.

25 Claims, 3 Drawing Sheets

METHOD AND COMPOSITIONS FOR MAKING REFRACTORY SHAPES HAVING DENSE, CARBON FREE SURFACES AND SHAPES MADE THEREFROM

CROSS REFERENCE TO RELATED APPLICATIONS

This application is a continuation-in-part of U.S. Ser. No. 08/490,792, filed Jun. 15, 1995.

BACKGROUND OF THE INVENTION

The present invention relates generally to refractory materials and, more particularly, to refractory compositions and shapes made therefrom for use in steelmaking operations. It is common practice in the continuous casting of steel to utilize special refractory materials and shapes to control the flow of the molten steel and to protect the liquid metal against oxidation as it is teemed from a ladle to a tundish and thence to the mold or molds. Among such special refractory shapes are slidegate plates and/or stopper rods which are used to control the flow of the molten metal. In addition, specially shaped refractory pouring tubes are associated with the ladle and the tundish, such as submerged ladle shrouds and nozzles which are employed to protect the molten metal from ambient oxidation during the teeming/casting operations. These refractory shapes are subjected to severe operating conditions and must be able to withstand thermal shock, as well as the chemical/erosive attack of molten steel and slag.

The above-mentioned steelmaking refractories are commonly made from carbon containing compositions, including one or more refractory grains such as alumina, zirconia, clays, magnesia, silicon carbide, silica or other dense grains of specific mesh size. These refractories also generally contain significant amounts of carbon in the form of graphite, carbon black, coke and like carbon sources plus a carbonaceous binder derived from sources such as pitch or resin. Such pressed and fired refractory shapes are known to possess good physical properties, particularly thermal shock, making them suitable for use in this severe operating environment.

It is well-known that during steelmaking operations, considerable amounts of oxygen may dissolve in the molten metal. In order to eliminate unwanted porosity, cracks and other internal defects which would lower the quality of the finished steel resulting from the presence of oxygen, molten steels are commonly de-oxidized or "killed" by the addition of aluminum metal, ferromanganese or ferrosilicon. In the common case of aluminum killed steel, the aluminum addition reacts with dissolved oxygen or iron oxide to form finely dispersed aluminum oxide in the melt, some of which remains as highly dispersed microparticles in the solidified steel while a portion floats into the slag above the molten steel. During continuous casting, this extremely fine dispersed portion of alumina has a tendency to either precipitate out of the molten steel on to the cooler refractory surfaces or it reacts and deposits on the ceramic refractory surfaces in contact therewith. This gradual build-up of alumina causes problems in the control of the flow of molten steel and may eventually cause blockage in the pouring nozzles. The precipitated alumina in the melt has a particular affinity to the conventional carbon bonded, alumina-graphite material, commonly used in the manufacture of ladle shrouds and submerged pouring nozzles. The alumina will continue to build up in the bore of the nozzle until the flow of molten steel is reduced to a point where the pouring tube must be lanced open by an oxygen torch, or the refractory tube is discarded. If oxygen lancing becomes necessary, the casting process is disrupted, costing time and money, because casting efficiency decreases and the quality of the steel must be downgraded due to the disruption in the continuous casting rim. Needless to say, the alumina blockage problem in continuous casting tubes decreases the expected useful life of the refractories and is very costly to steel producers. In aluminum killed steels where high dissolved oxygen concentrations are expected, the useful life of a submerged pouring nozzle may be limited to 2–3 ladles due to heavy alumina build-up on the interior diameter of the casting tubes.

Heretofore, one of the solutions to this alumina build-up problem has been the development of an argon injected nozzle which allows high pressure argon to permeate the porous interior diameter of the nozzle during casting. In this approach, it is believed that a protective layer of inert gas hinders the bonding of the dispersed alumina to the refractory. The argon also reduces the oxygen partial pressure at the refractory-molten metal interface, again decreasing the possibility for adherence of alumina deposits. Such a gas permeable immersion pouring nozzle is disclosed in U.K. Patent Application GB 2,111,880A to Gruner et al. Naturally, the argon injection approach extends the nozzle life but at increased cost due to the added expense of utilizing large volumes of argon during casting as well as the increased manufacturing costs of the more complex argon injection nozzle.

It has also been proposed to provide a pouring nozzle with a lower melting point nozzle liner composition to prevent alumina build-up therein. Liner materials include the use of calcia, magnesia and alumina, as disclosed in U.K. Patent Application GB 2,170,131A to Tate. These materials develop low melting eutectics causing the liner to wash out of the nozzle as alumina is deposited. The melting action of the liner prevents the alumina build-up within the bore and allows for the free flow of molten steel therethrough. Also reported to be effective in prevention of alumina adhesion is a sleeve of magnesia disclosed in U.K. Patent Application GB 2,135,918 to Rosenstock et al.

In U.S. Pat. No. 4,870,037 to Hoggard et al., owned by the assignee of the instant invention, an anti-build-up liner of carbon bonded, sialon-graphite refractory composition is disclosed. A still further attempt to minimize alumina build-up in pouring nozzles is set forth in commonly owned U.S. Pat. No. 4,913,408 to Hoggard et al., which discloses a nozzle liner composition of carbon and a composite selected from the group consisting of zirconia and O'-Sialon and zirconia in silicon oxynitride compositions. While these compositions have somewhat improved the anti-build-up properties of the refractory shapes, it is noted that the sialon constituent is a relatively expensive refractory material which necessarily increases the cost of the nozzle.

More recently, in commonly owned U.S. Pat. No. 5,370, 370 to Benson, a carbon bonded refractory body is disclosed for use in casting aluminum killed steel. The refractory shape has a metal contacting surface which is resistant to both steel erosion and the build-up of alumina. More particularly, a layer is formed along a selected molten metal contacting surface by first firing the pressed body in an oxidizing atmosphere wherein the carbon is oxidized (decarburized) to form a porous, oxidized zone on the selected steel contacting surfaces. The remaining surface portions of the body are glazed to protect against oxidation during this firing operation. A carbon free refractory slip or slurry is then infiltrated into the porous oxidized zone to create an erosion and alumina build-up resistant surface layer therein. Benson theorized, and confirmed in the laboratory, that carbon monoxide (CO) gas is generated in conventional carbon containing refractories at steelmaking temperatures and that the CO reacts with aluminum dissolved in the molten steel to form alumina at the refractory wall. While the method and article taught in the Benson '370 patent are effective in preventing the build-up of unwanted alumina, the procedure is somewhat time consuming and the resulting article is relatively expensive to manufacture.

The present invention represents an improvement over the aforementioned methods, compositions and materials and provides a refractory composition, method of manufacture and resultant refractory shape which is extremely resistant to alumina build-up, thermal shock and erosion. The refractory composition of the invention is suitable for use in making integral nozzle liners or complete shapes for contact with liquid steel and/or slag or where high hardness, wear and erosion resistance are needed.

In the parent application, Ser. No. 08/490,792, certain compositions and methods are disclosed which are suitable for making copressed or composite shapes, that is, shapes having a layer of the composition of the present invention copressed with a body having a conventional refractory composition. Upon firing, selected carbon free surfaces are formed on an underlying body of conventional refractory material. The material of the instant invention is, by contrast, suitable for making the entire shape therefrom such as, for example, an entire pouring nozzle. Other shapes such as slide gate plate inserts, tundish nozzles or inner nozzles, tundish nozzle plates, stopper rod heads, immersion thermocouple sheaths or slagline sleeves, for example, may be made wholly from or partially from the composition of the present invention applied to the metal contacting surfaces thereof to provide extra protection in those areas against steel erosion, wear and/or alumina build-up. This is especially true in the case of aggressive steels having a high oxygen content which are not always killed (at all or completely) and cause severe erosion problems in conventional refractories.

In addition, a presently preferred composition of the present invention is stronger than conventional alumina-graphite body materials permitting the use of thinner cross sections so as to provide a significant savings in material usage when the entire shape, such as a pouring tube, is made therefrom. Such thinner cross sections also translate into lower part weights to provide easier handling and lower net shipping costs than the same shapes made from a conventional alumina-graphite composition.

The present invention further provides a dense surface after firing which eliminates the need and expense of glazing which is conventionally used in carbon bonded refractories to protect the underlying carbon from oxidation during service. Still further, the method according to the instant invention provides an efficient and cost effective process for forming these improved refractory shapes.

SUMMARY OF THE INVENTION

Briefly stated, the refractory composition according to the present invention consists essentially of in weight % on a dry mix basis, at least about 70% of a refractory oxide, such as alumina; less than about 10% total carbon; an effective amount of permeability reducers, plus secondary oxide grains in an amount up to about 25%. The material is pressed in the form of a desired shape and then subsequently heated in an oxidizing atmosphere at a temperature of about 900°–1400° C. for about 5–20 minutes, depending upon the temperature. During this heating step, the carbon present in the surface of the shape (exposed to the atmosphere) is oxidized to produce a carbon free, porous layer therein, typically between about 2–5 mm in depth. Simultaneously, during the heating step, as the decarburization of the surface proceeds, a sintering/densification mechanism also actively progresses. The mechanism causes densification of the refractory grains in the carbon free surface layer resulting in a dense, oxide bond having very low porosity and, hence, low gas permeability. The densification occurring within the oxidized carbon free surface layer continues rapidly to a point where infiltration of ambient oxygen into the refractory shape can no longer occur. Thus, at a depth beyond the densified, oxide bonded, carbon free layer (on the order of about 2–5 mm), the underlying refractory material develops a carbon bonded structure having a composition substantially the same as the original mix composition prior to the high temperature heating. This underlying carbon bonded structure in the body of the refractory shape is desirable, particularly with respect to the enhanced thermal shock resistance resulting therefrom. The heating step is preferably accomplished during a conventional preheating operation conducted prior to use. A conventional oxy-gas fired flame sometimes used in such preheating operations produces a temperature of about 1200° C. and is preferably conducted for a period of about 30 to 45 minutes.

The composition of the present invention may be used to form a selected molten metal contacting surface and/or to form a hard, wear resistant surface on any commonly used refractory shape wherein the balance of the shaped body is made from a copressed conventional carbon bonded material such as, for example, alumina-graphite. More preferably, however, an entire pressed refractory shape is made from the material of the present invention. A preferred composition for making an entire shape, according to the present invention, contains less than 9% total carbon, of which approximately 5% by weight is graphite with the balance of the carbon being that contained in the binder system. Approximately ¼ of the total carbon content is volatized from the binder system when the pressed shape is cured at low temperature prior to firing. Typical preferred carbon contents in the underlying body of the fired shape may range between 2%–15% and, more preferably, between about 3.5% to about 7% by weight. The composition also more preferably contains about 2%–8% by weight of a metallic phase which oxidizes during firing to form a reaction phase closing off the pores to prevent further migration of oxygen into the material which thus limits the depth of oxidation during thermal treatment. In all instances, the outer surface of the material is characterized by the presence of the dense, carbon free layer after firing in air or in an otherwise oxidizing atmosphere. The dense, carbon free surface layer is characterized by having high hardness and wear resistance. The surface is also erosion resistant and resists build-up of alumina due to the absence of carbon in the surface of the refractory. The dense surface also prevents migration of any gas species therethrough, such as CO, which further prevents the occurrence of alumina build-up problems. These features as well as other aspects and advantages of the invention will become evident when reference is made to the following detailed description taken with the appended drawings.

DETAILED DESCRIPTION OF THE INVENTION

Figures 1, 2:
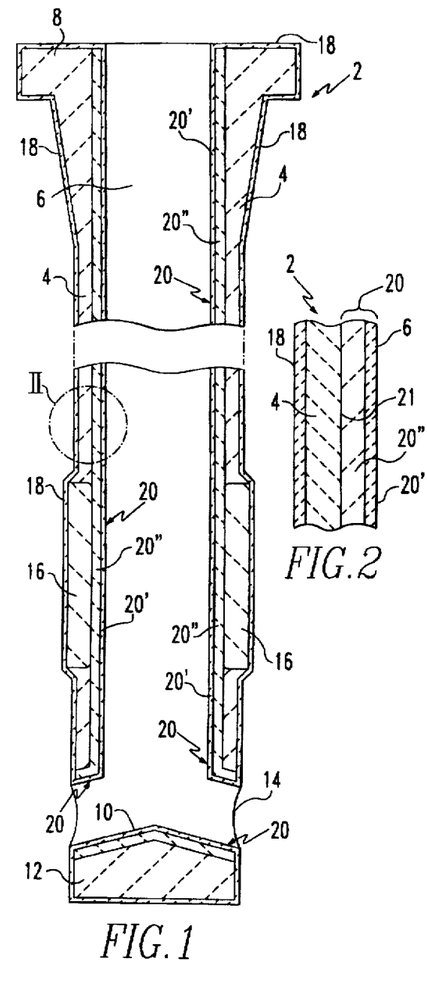
FIG. 1 is a cross sectional, side elevation view of a submerged entry nozzle having a dense, carbon free liner of the present invention formed therein.
FIG. 2 is a slightly enlarged, cross sectional view of the sidewall, taken at area II—II of FIG. 1.

With reference to the drawings, one presently preferred embodiment of a submerged entry nozzle according to the present invention is shown in FIG. 1. Pouring tubes or nozzles of the general configuration depicted in FIG. 1 are commonly used in the continuous casting of steel. The nozzle 2 includes a body 4 made from an isostatically pressed and fired refractory material, such as a conventional, carbon bonded alumina-graphite. A known alumina graphite composition for body 4 may include the following constituents, in % by weight, about: 32% carbon; 52% alumina; 14% silica; and 2% other additions. The carbon is derived principally from graphite plus a lesser amount from the carbonaceous binder such as, for example, a known pitch or a resin binder system.

The nozzle 2 has a teeming orifice or bore 6 extending axially therethrough. The axial bore 6 extends from a top flanged end 8 and terminates at a floor or blind end 10 near the bottom end 12 of the nozzle. A plurality of openings forming casting orifices 14 extend outwardly through the body 4 communicating with the bore 6 adjacent the floor 10 to permit the delivery of molten steel to a continuous casting mold (not shown). A slagline sleeve 14 of an erosion and corrosion resistant material such as, for example, zirconia-graphite, is isostatically copressed with the body 4. The nozzle 2 thus far described is conventional and well-known in the art. In conventional practice, after pressing, a carbon bonded refractory shape is fired at a temperature of about 1000° C. for a period of one hour or more in a reducing or otherwise non-oxidizing atmosphere to protect the carbon phase. The external surface of the body is also coated with a conventional glaze 18 to form a glassy layer thereon to further protect the carbon from oxidation during preheating and in service. The glaze 18 may be applied in a thickness of up to about 5 mm with a thickness of about 3 mm being presently preferred.

The nozzle 2 depicted in FIG. 1 has a selected molten metal contacting surface portion forming a liner portion 20 which coincides with the bore 6 as well as the casting orifices 14 and floor 10 made from the composition according to the present invention. As seen in FIG. 1, the liner portion 20 forms a jacket or barrier along the surfaces of the nozzle bore 6 in contact with the molten steel where deposition of alumina and blockage are likely to occur. The liner portion 20 in one presently preferred formulation is principally made up of alumina material, on the order of at least 60 weight % or more. The particle size distribution and type of alumina used in the refractory mix is important because it influences the sintering/densification rate as well as the final density levels achieved in the fired material. The alumina portion of the composition of liner portion 20 preferably contains about 50–75% calcined alumina. About 25–40% by weight of the alumina mix is made up of relatively coarse grains having a U.S. mesh screen size greater than 65. About 10–30% by weight of the alumina is finer than a –325 mesh. Such a mixture of aluminas preferably comprise at least about 70% by weight of the composition of the material mix. The balance of the composition includes less than about 10% total carbon comprising about 5% graphite and about 5% binder carbon. A secondary refractory grain such as, for example, zirconia mullite, is also preferably present in an amount up to about 20% by weight. In addition, the composition preferably contains about 1–4% of very free reactive silica, such as "fumed" or micro silica to react with the alumina to produce a fraction of mullite. Densification of the liner 20 is further aided by the occurrence of the mullite reaction which creates a ceramic bond between adjacent particles at relatively low temperatures-on the order of 1000°–1200° C. Additional densification promoters or permeability reducers such as one or more of an oxidizable metal, borax, boron carbide, boron nitride and/or other boride glass formers are added in effective amounts (1–6 weight %) to further increase the densification of the material during firing.

The refractory powder mixture making up the liner portion 20 is preferably isostatically copressed in a mold along with the body 4 and slagline sleeve 16 to produce the nozzle 2 shown in FIG. 1. The nozzle 2, after pressing, is heat treated to moderate temperatures (800°–1000° C.) to produce the carbon bond phase. The shape is then given a firing treatment either by the manufacturer or conducted by the end user by way of a preheating treatment prior to use in a continuous casting operation to develop the final characteristics desired in the invention. A conventional gas preheat burner is employed having a flame temperature of above 800° C. and preferably between 10000°–1500° C.

During firing, the surface of the liner 20 coinciding with the nozzle bore 6 is directly exposed to oxygen. The oxygen at this high temperature immediately reacts with the carbon constituent in the liner 20, causing a decarburization along the surface. By way of example, the sleeve 20 may have a thickness of about 10 mm while the decarburized layer formed during firing will preferably be about 3–5 mm in thickness. Two simultaneous phenomena occur during the firing step, namely, oxidation and densification. On one hand, oxidation of the carbon takes place which increases the permeability/porosity of the liner 20 in proportion with the amount of carbon present. For this reason, the carbon content of the liner is preferably held to no more than 10 weight %, and more preferably the carbon is limited to no more than 9 weight %, and still more preferably, to a level of no more than about 5 weight %. While the oxidation of the carbon proceeds, the densification of the ceramic particles in the decarburized or carbon free outer region 20' of liner 20 also takes place simultaneously therewith. Thus, the porous, decarburized outer surface begins to densify and the pores between the refractory grains disappear as densification progresses. Such densification eventually prevents the further infiltration of atmospheric oxygen into the interior of the sleeve 20 to prohibit further oxidation/decarburization within the balance of the carbon containing refractory material. For the purposes of the present invention, it is necessary that the densification of the surface layer proceed rapidly in order to outpace the oxidation rate. In other words, the densification should take place relatively quickly so as to prevent complete decarburization by oxidation of the balance of the material. For this reason, the permeability reducers mentioned above are employed so as to accelerate the densification of the porous oxidized layer.

FIG. 2 depicts an enlarged cross section of the sidewall of nozzle 2 showing the body 4 and the liner portion 20 after firing. It will be observed that the liner 20, after the preheating firing step, includes an outer, carbon free, densified layer 20' and an inner sublayer 20". The inner sublayer 20" contains carbon due to the fact that it was protected from oxidation by the then densifying outer layer 20'. As stated above, the densification of layer 20' prohibits migration of oxygen to the sublayer 20". Hence, the composition of sublayer 20" remains identical to the original composition of the liner 20 prior to the firing step. Layer 20", of course, is densified during the preheating operation and during service and further bonds at its interface 21 with the refractory body 4 by virtue of the similar carbon binder systems employed in the ceramic mixes forming the body 4 and the liner 20. The outer, carbon free, densified layer 20' of the liner 20 is coextensive with the bore 6 and prevents migration of CO gas from the sublayer 20" or from body 4 into the molten steel, thus preventing the unwanted generation of alumina within the nozzle 2.

Ideally, the temperature of the nozzle 2 should be raised rapidly during the preheating step to a temperature of at least 1000° C. and, more preferably, to at least about 1200° C. within a time of between about 20 minutes to about 45 minutes. Heating rates of from about 25°/minute to about 40°/minute up to at least 1200° C. are presently preferred heating rates for use in preheating/firing the liner 20. This heating rate range results in heating times of between about 30 minutes to 45 minutes to reach 1200° C. The nozzle 2 is then held at this 1200° C. temperature, or slightly higher, for about 30 minutes minimum to insure proper densification/ sintering of the layers 20', 20" as well as the body 4. The preheated shape is then ready for service.

By way of example, in practice, a 615,000 BTU/hour oxy-gas burner flame (not shown) is directed vertically down the inlet at top 8 of the bore 6 of the nozzle 2 for satisfactory preheating and firing of the liner 20 and body 4. Firing may also be accomplished by the use of two oxy-gas burners (not shown) directed in the casting ports 14 at the bottom 12 of the nozzle 2. In the above example, the nozzle 2 of FIGS. 1 and 2 had a wall thickness of 28 mm. The wall thickness of the refractory shape to be heat treated will influence the temperature sensed on the outside surface thereof. Naturally, heavier walled shapes will exhibit lower surface temperatures than thinner walled shapes, when fired internally, assuming the same refractory materials are used in each.

The layer of glaze material 18 also densifies along the outer surfaces of the body 2 during heating to prevent unwanted oxidation of the carbon in the conventional carbon bonded alumina, and zirconia-graphite materials during preheating and use. It will be noted that the glaze, however, is not applied on the surface of the line 20 since it would prevent the desired oxidation of the layer 20' during the preheating operation. In use, it is necessary that the liner 20 present an outer surface layer 20' which is not only dense, but also carbon free. The dense, low permeability, carbon free layer 20' prevents any inward migration of oxygen to react with carbon as well as the reverse migration of CO gas to the outer surface, thus preventing the occurrence of unwanted alumina deposition problems heretofore prevalent in carbon containing refractories.

Figures 3, 4:
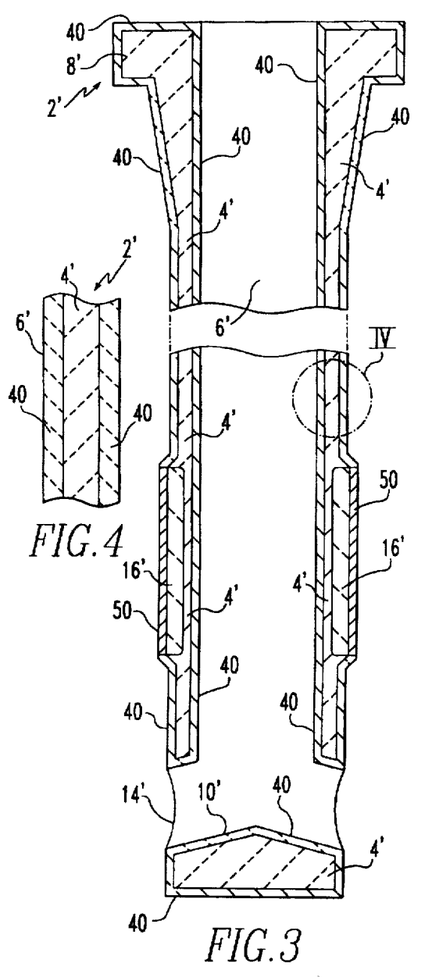
FIG. 3 is a cross sectional, side elevation view of a submerged entry nozzle similar to FIG. 1 wherein the entire shape is made from the material of the present invention.
FIG. 4 is a slightly enlarged, cross sectional view of the sidewall of the nozzle shown in FIG. 3, taken at area IV—IV thereof.

A further and presently more preferred embodiment of the present invention is depicted in FIGS. 3 and 4 in which the entire continuous casting nozzle 2', except for the slagline sleeve 16', is made from a refractory composition of the invention. Nozzle 2' is shaped like nozzle 2 of FIG. 1 and also functions as a submerged pouring tube for transferring molten steel from a tundish to a continuous casting mold (not shown). In the embodiment of FIGS. 3–4, a carbon free, oxidized and densified layer 40 forms along all of the exposed surfaces of the nozzle 2' after firing. As a result, no conventional glazes need be applied to the shape since the presence of the carbon free, densified layer 40 protects the carbon in the underlying body 4' from reaction with oxygen. In addition, the presence of the densified layer 40 prevents the reverse migration of carbon monoxide gas into the molten steel and prevents the formation of alumina therein, as previously discussed.

The sidewall of the pouring tube 2' made according to the embodiment shown in FIGS. 3 and 4 has a sidewall thickness of about one-half that of a conventional nozzle made from an alumina-graphite material. This reduction in cross section results from the fact that the refractory composition of the present invention possesses superior strength compared with conventional alumina-graphite material. By way of example, a pouring tube or nozzle 2' made entirely (except for the slagline sleeve 16') from a refractory mix of the present invention has a wall thickness of about 15 mm compared with a conventional alumina-graphite tube which typically has a sidewall thickness on the order of about 28–30 mm. Naturally, this represents a significant material and weight savings in a product which typically has a length on the order of 900 mm (about 3 feet). Due to the fact that the refractory composition of the present invention is stronger and more erosion resistant than conventional alumina-graphite, the wall thickness may be reduced without sacrificing any mechanical strength or service life. In the sidewall shown in the slightly enlarged view of FIG. 4, the carbon free, densified layer 40 on the inner and outer surfaces of the pouring tube or nozzle 2' has a thickness of between about 2–4 mm, while the interior body portion 4' has a thickness on the order of about 10 mm. A presently preferred thickness for the layer 40 is about 2.5 mm. It will also be noted that the body portion 4' of the nozzle 2' is carbon bonded and contains graphite so as to provide good thermal shock properties.

As is conventional in the manufacture of carbon bonded refractories, the isopressed nozzle is coked at a moderate temperature of between about 800°–1000° C. for about 1–3 hours to establish the carbon bond phase throughout the refractory body and the slagline sleeve. This coking operation is conducted after pressing or otherwise forming the shape and prior to the preheating/firing step. In order to protect the carbon (binder carbon and graphitic carbon) in a pressed refractory body against oxidation, conventional coking is either carried out in a non-oxidizing atmosphere or the pressed body is first coated with a glaze 18 (as shown in FIG. 1) if the shape is to be coked in an open, oxygen containing atmosphere. The glaze layer 18 provides a glassy barrier on the surface and prevents the atmospheric oxygen from reacting with the carbon constituent in the body 4. This is conventional practice. In the present invention, one composition of the liner 20 is such that the carbon in the liner portion (bond phase and graphite) must be protected against excessive oxidation during the coking step, usually with a protective atmosphere. The coked composition is then preheated to oxidize and densify the surface layer, as described above.

The instant invention also includes another presently preferred composition for the liner 20 or for the entire nozzle 2' which can be successfully coked in an oxygen containing atmosphere. This preferred composition develops a controlled rate of oxidation during coking in an open atmosphere which proceeds to a depth of about 2–2.5 mm and then stops. This advantageous feature is achieved by the addition of a controlled amount of an oxidizable metal to the composition. During oxidation, as for example occurring in an open atmosphere coking step, the oxidizable metal constituent, such as silicon metal or aluminum metal, oxidizes, resulting in the formation of a glassy phase. This glassy phase then behaves as a passive oxidation layer in which further oxidation of the mix becomes dependent on the transport of gaseous oxygen ($O_2$) through the newly formed glassy phase to the unoxidized carbon and metal in the mix. The passive oxidation follows the rules of parabolic kinetics, that is, the oxidation rate decreases dramatically as the thickness of the glassy phase increases. After coking, this preferred metal containing mix provides a surface which has a porous, oxidized (carbon free) layer on its outer surface of controlled depth of 2–2.5 mm in thickness. Upon preheating of the shape 2, the open pores in the previously formed oxidized layer close as densification progresses at preheating temperatures above 1000°–1200° C. to produce the desired dense, gas impermeable, carbon free layer 20' of FIG. 2 or layer 40 of FIGS. 3 and 4.

One presently preferred formulation of a refractory material mix for isopressing a carbon free liner 20 or for forming a complete refractory shape 2' which may be coked in an open atmosphere, as discussed immediately above, consists essentially of the following constituents in weight %:

|     | Constituent | wt. % |
| --- | --- | --- |
|     | Alumina ($Al_2O_3$) | 50–70% |
|     | Zirconia mullite ($ZrO_2.(3Al_2O_3.2SiO_2)$) | 0–20% |
|     | Silicon metal (Si) | 2–8% |
| mix | Boron carbide ($B_4C$) | 1–3% |
|     | Micro silica ($SiO_2$) | 1–3% |
|     | Carbon (C) (Graphite + binder) | 3–13% |

In this mixture, the alumina grains are sized as discussed above to provide good packing density and densifying characteristics. One or both of the permeability reducers, micro silica or boron carbide, should be used. The mixture is then placed in a mold and isostatically pressed into a desired shape, such as the liner 20 of FIG. 1, or the complete nozzle 2' of FIG. 3. After pressing, the shape is fired in an open atmosphere at about 800° C. to develop the carbon bond phase and to form the oxidized, carbon free, porous surface layer. Due to the presence of silicon metal in the mix, the oxidized layer stops forming after a period of time at a depth of about 2–2.5 mm. The shape is then preheated prior to service at a preferred temperature on the order of about 1200° C. to permit the porous, oxidized layer to densify to form the dense, carbon free layer 20' of FIG. 2 or layer 40 of FIGS. 3 and 4. The carbon free, dense layer 20' or 40 develops an oxide bond between the adjacent ceramic particles as densification progresses and the pores disappear during the firing/preheating step. The underlying cured, coked and fired/preheated layer 20" of FIG. 2 and body 4' of FIGS. 3 and 4 exhibit a carbon bonded alumina graphite composition similar to the original mix composition, except that a portion of the initial carbon content in the binder has volatized out during thermal treatment to yield a reduced carbon content in portions 20" and 4'. Due to the fact that the underlying portion 20" and body 4' contain a predominately carbon bonded, alumina-graphite composition, thermal shock properties are not sacrificed.

A presently preferred, higher strength composition of the present invention for the manufacture of an entire refractory shape is set forth in Table 1. This is a composition of the pressed refractory shape, that is after isostatic pressing and coking, but prior to preheating/firing.

TABLE 1

| Composition | | |
| --- | --- | --- |
| Constituent | Range (wt. %) | Nominal (wt. %) |
| Alumina ($Al_2O_3$) | 60–85 | 75 |
| Micro silica ($SiO_2$) | 1–3 | 2 |
| Zirconia mullite ($ZrO_2.(3Al_2O_3.2SiO_2)$) | 3–10 | 6 |
| Boron carbide ($B_4C$) | 2–5 | 4 |
| Silicon metal (Si) | 2–6 | 4 |
| Carbon (C) (Graphite + binder) | 3–13 | 7 |
| Incidental constituents: | Balance | Balance |

Table 2 demonstrates that the strength of the materials of the invention is relatively high. The material of the present invention is compared in Table 2 with the oxidized and alumina infiltrated, alumina-graphite material disclosed in U.S. Pat. No. 5,370,370 which is considered to be very strong but also very expensive to manufacture. The strength, as measured by the modulus of rupture (MOR) values at 1480° C., indicates the high strength of these materials when subjected to elevated temperatures for about 10 minutes. In a further test not listed in Table 2, a sample piece made from the composition of the present invention was left in the furnace for several hours to completely oxidize and sinter the material. This carbon free, completely oxidized and densified sample of the present composition exhibited an MOR at 1480° C. of 1700 psi which is also considered good. Such high strength is important to the integrity and erosion resistance of the material. Thermal expansion characteristics are also important, especially with respect to thermal shock and cracking caused by differential expansion/shrinkage and the thermal expansion properties of the materials of the invention are excellent compared with conventional unoxidized materials.

TABLE 2

| Physical Properties | | |
| --- | --- | --- |
| Property | Infiltrated* | Present Invention |
| MOR (RT): | 4000 | 4000–5000 |
| MOR (1480° C.): | 2000 | 1200–2000 |
| App. Porosity: | 20.0 | 15.5–17.0 |
| App. Sp. Gravity: | ~3.8 | 3.60–3.70 |
| Thermal Expansion, | | |
| RT - 1600° C.: | — | +1.4% |
| RT - 1600 - RT: | — | 0.0 to −1.2% |
| Depth of C-free, oxidized layer: | 5–10 | 2–10 |

*U.S. Pat. No. 5,370,370 - oxidized and infiltrated with $Al_2O_3$

Table 3 reports the depth of oxidation in millimeters for preheating or firing at various times and temperatures for a material of the present invention having a nominal composition reported in Table 1. The material was formed into cubes measuring 25 mm per side. The cubes were oxidized on one surface only in a resistance type furnace. Oxidation depth measurements reported in Table 3 indicate that the depth of the oxidized, carbon free layer can be controlled by selecting the heating temperature and the heating time. Table 3, likewise, demonstrates that at the higher temperatures, 1300°–1400° C., the densification phenomenon takes precedent over the oxidizing phenomenon and quickly closes off the pores to prevent the formation of a carbon free layer of any significant depth. Hence, a preheating/firing temperature of 1200° C., or slightly in excess thereof, is preferred to provide a desired, carbon free, oxidized layer of about 2–5 mm in depth.

TABLE 3

| Temp | Oxidation Depth | | |
| --- | --- | --- | --- |
| | 1 hour | 2 hours | 3 hours |
| 1200° C. | 3.0 mm | 3.8 mm | 5.0 mm |
| 1300° C. | 3.0 mm | 3.3 mm | 3.1 mm |
| 1400° C. | 0.7 mm | 0.5 mm | 0.4 mm |

Actual pouring tubes or nozzles 2 were manufactured having liners 20 made from material of the present invention. The test nozzles were used in the actual casting of steel in an operating steel plant. Casting trials indicate that the erosion resistance and the resistance to alumina build-up in the material of the invention were good.

Figure 5:
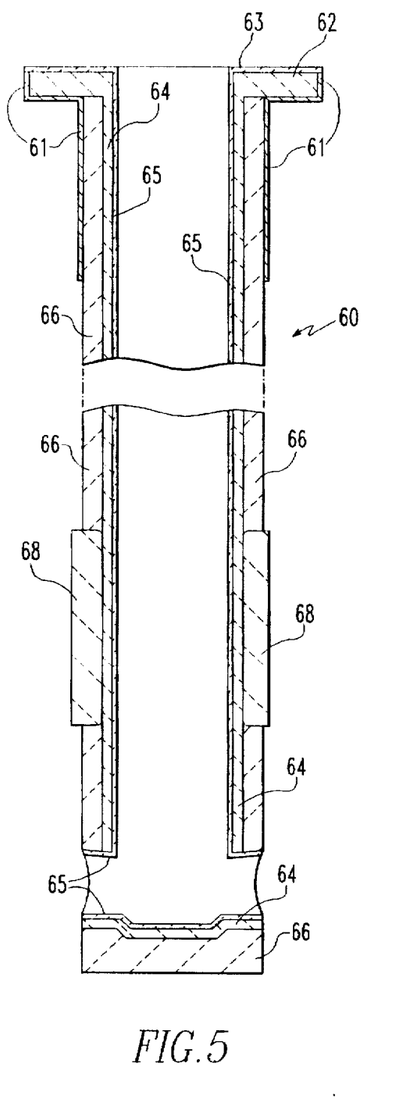
FIG. 5 is a cross sectional, side elevation view of a lower plate and integral pouring nozzle for use on a tundish sliding gate valve having selected portions made from the composition and method of the present invention.

The above-described pouring tubes or nozzles 2, 2' are also referred to in the art as submerged entry shrouds ("SES") or submerged entry nozzles ("SEN"). In addition to these SES and SEN products, the instant invention is useful in the manufacture of other metal handling refractory shapes. FIG. 5 depicts a so-called monoblock submerged pouring tube and integral slide plate 60 for use in a slide gate valve for metering the flow of molten steel from a tundish to a continuous casting mold. The shape 60 can be made entirely from the composition of the present invention or it can have selected portions made therefrom. For example, the top plate 62 and inner bore liner 64 are made from a composition of the invention and thermally treated according to the method of the present invention to form a carbon free, dense layer along these selected surfaces. As depicted in FIG. 5, after preheating/firing, a dense, carbon free layer 63 is formed along the upper surface of the top plate 62 and a dense, carbon free layer 65 also forms around the outer surface of the bore liner 64. The wear resistant property of the hard, carbon free, dense layer 63 is advantageous to the operation of a slide gate plate portion 62, while the anti-alumina deposition properties of the carbon free layer 65 along the liner 64 are also beneficial in extending the service life of the pouring nozzle. The composite shape 60 also includes a body portion 66 made from a conventional refractory mix such as alumina-graphite with a conventional slagline sleeve 68. All of these parts would be copressed and subsequently thermally treated, as previously described, to produce the desired carbon free, densified layer 63 along the top of the plate portion 62 and layer 65 on the surface of the bore liner 64. A conventional steel jacket or can 61 may encase the top portion of the monoblock shape 60 to provide protection and added strength when the piece is operable in the slide gate valve.

Figure 6:
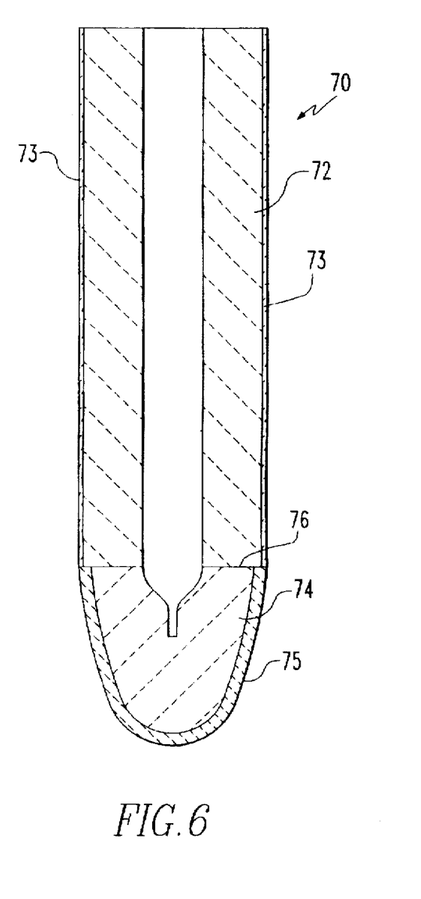
FIG. 6 is a cross sectional, side elevation view of a stopper rod for use in a tundish having a nose portion made from the material of the invention.

The material and method of the present invention are also useful in manufacturing a tundish stopper rod 70 shown in FIG. 6. The stopper rod has a cylindrical body 72 made from a conventional refractory composition such as, for example, alumina-graphite. The bullet-shaped nose 74 of the stopper rod is made from the material of the present invention and is copressed with the body 72 in a known manner. The body 72 preferably has a conventional glaze layer 73 applied around its outer surface to protect the carbon from oxidation. Upon preheating of the stopper rod 70 prior to service, using the previously described time and temperature, a dense, carbon free layer 75 is formed along the outer surface of the nose 74. The erosion resistant properties of the dense, carbon free layer 75 are particularly well-suited for the use environment of a stopper rod.

The interface 76 between the body 72 and the nose 74 forms a strong joint due to the copressing and due to the fact that similar or identical carbonaceous binder systems are employed in the mixes making up the body and the nose. In this manner, a carbon bond is established across the interface 76 after thermal treatment. In addition, similar thermal expansion properties can be developed between the body and nose portions by employing a predominately alumina-graphite composition in each.

Figure 7:
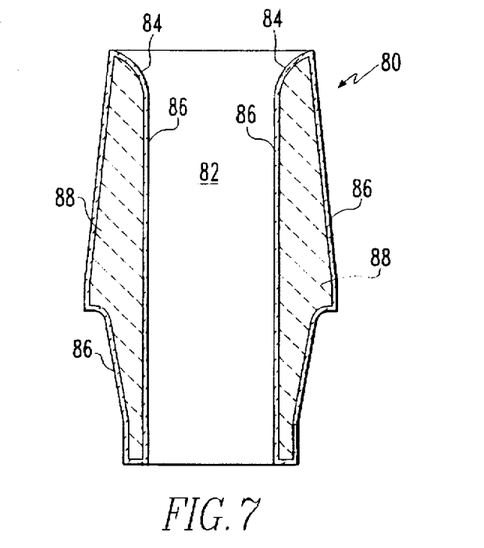
FIG. 7 is a cross sectional, side elevation view of a tundish nozzle or inner nozzle for a tundish made according to the present invention.

Another steelmaking refractory shape which may be made from the composition, and according to the method of the present invention, is a tundish nozzle or inner nozzle 80 shown in FIG. 7. The inner nozzle 80 is fitted in a known manner in the bottom floor wall of a tundish to permit molten metal to flow from the tundish to a lower pouring tube and continuous casting mold (not shown). The nozzle 80 has an axial bore 82 through which the molten metal passes a radially shaped portion 84 is formed at the top of the nozzle bore 82 and is adapted to provide a seat for the nose portion of a stopper rod, such as the stopper rod nose 75 of FIG. 6. Upon preheating, as previously described, the exposed surface of the nozzle 80 is decarburized and densified to form a carbon free, dense layer 86 therearound. The inner core or body 88 of the nozzle 80, as in the previously discussed embodiments, comprises a desired carbon bonded refractory oxide structure after firing/preheating. It will be further appreciated that the carbon free, dense layer 86 formed along the radially shaped seating portion 84 provides a hard, erosion resistant surface to counter the effects of flowing molten steel. This layer 86 also presents a wear resistant seating surface for consistent mating with the stopper rod nose. In addition, the carbon free, dense layer 86 around the nozzle bore 82 also prevents unwanted alumina formation and bore plugging problems previously discussed. It is also known that erosion or alumina deposition in the stopper rod seating portion 84 may result in an uneven surface therealong and can create gaps between it and the stopper rod nose when the stopper rod is lowered, creating molten metal leakage. This harmful condition is eliminated by the instant invention.

Figure 8:
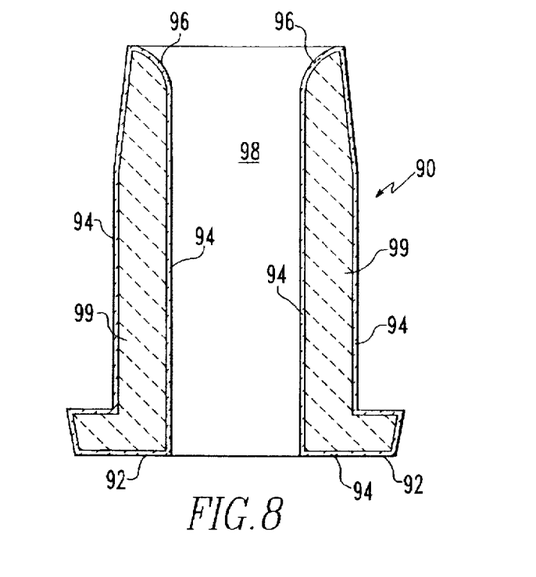
FIG. 8 is a cross sectional, side elevation view of a tundish nozzle plate made according to the present invention.

Still yet another steelmaking refractory shape which may be made from the present composition, and according to the method of the invention, is a tundish nozzle plate 90 depicted in FIG. 8. The nozzle 90 is also fitted in the bottom of a tundish similar to the nozzle 80 of FIG. 8 but is used in installations which employ a lower changeable pouring tube (not shown). In this regard, the nozzle 90 includes a lower flat plate portion 92 which is adapted in use to engage a flat upper plate carried by the changeable pouring tube. In such installations, a truly flat, hard and wear resistant surface in the plate portion 92 is desirable. Such properties are obtained when the nozzle 90 is made from the refractory material of the present invention. After firing/preheating, the previously described carbon free, dense layer 94 is formed along the exposed surface of the shape to provide these desired properties. As in the previously described nozzle 80, the nozzle 90 of FIG. 8 also has a radially shaped stopper rod nose engaging a seat portion 96 and a bore 98 having the beneficial erosion resistant and anti-alumina deposition characteristics to greatly enhance the service life and overall performance of the nozzle. The inner core or body 99 of the nozzle 90 also possesses the desired carbon bonded structure which makes the shape well-suited for high temperature service. As in the previously described shapes, the nozzles 80 and 90 required no conventional glazing to protect the graphite and carbon bond constituents of their respective inner cores or bodies 88 and 99 by virtue of the presence of the carbon free, dense layers 86 and 94, respectively.

While the examples of the presently preferred compositions discussed herein are comprised predominately of alumina-graphite material, it will be understood by persons skilled in the art that the major portion of the composition could be one or more other refractory oxide-graphite systems such as, for example, zirconia-graphite, magnesia-graphite, spinel-graphite, mullite-graphite, silica-graphite and mixtures thereof. The critical feature in any refractory oxide system employed is to limit the total carbon content to less than about 10% and to include the densification promoters/permeability reducers in the mix. In order to limit the depth of the oxide layer when firing in an oxygen bearing atmosphere, it is necessary to have an oxidizable metal, preferably silicon, in the refractory mix. Other metals may be substituted for silicon such as, for example, alloys of silicon and aluminum, molybdenum or cobalt may be used for this purpose. Other permeability reducers such as borax, boron carbide, other borides and glass formers may also be used to close off the pores beneath the oxidized layer so as to protect the underlying carbon in the body. The pressed shape is subjected to the previously discussed thermal treatment to first create the oxidized, carbon free layer and then this porous, carbon free layer is densified to develop the desired dense, gas impermeable layer on the outer surface of the shape. In all of these refractory oxide formulations, inward migration of oxygen and outward migration of carbon monoxide to and from the carbon containing body are prohibited by the dense carbon free layer to prevent alumina deposition/blockage problems.

In the case of a zirconia-graphite formulation made according to the present invention, the slagline sleeve 16' of FIG. 3, for example, may be co-pressed with the body 4' having a composition containing alumina graphite. In such a formulation, the outer surface layer 50 of the slagline sleeve 16' would consist of a carbon free, gas impermeable layer of material similar to layer 40, thus eliminating the necessity of using any glazing materials since all exposed surfaces of the shape 2' are carbon free and dense.

It is also apparent that refractory shapes other than the above described pouring nozzles and stopper rod could be advantageously manufactured using the compositions of the present invention. Various other shapes employed in the handling of molten steel or in other non-metallurgical environments requiring high hardness, wear/erosion resistant surfaces, and/or thermal shock resistance are ideal candidates for the material and method of the present invention.

While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

What is claimed is:

1. A refractory shape having at least a selected surface with a dense, carbon free layer thereon, said surface made from a refractory mix containing one or more refractory oxides, less than about 10% by weight carbon, and an effective amount of permeability reducers to increase a rate of densification of said refractory oxides during heating, wherein, upon heating said refractory shape to a selected temperature, the carbon in said selected surface is oxidized and the refractory oxides are densified to form said dense, carbon free layer.

2. The refractory shape of claim 1 comprising a body made from an alumina-graphite containing material underlying said selected surface and wherein a major portion of said refractory oxides contained in said selected surface comprises alumina.

3. The refractory shape of claim 1 wherein said shape is made entirely from the refractory composition of said selected surface.

4. The refractory shape of claim 1 wherein said refractory composition includes an oxidizable metal addition adapted to control a depth of oxidation in said selected surface.

5. The refractory shape of claim 1 in the form of a nozzle for use in casting steel and wherein said selected surface is an area surrounding a bore of said nozzle.

6. A pressed refractory shape for use in handling molten steel made entirely from a refractory mix containing one or more refractory oxides selected from the group consisting of alumina, zirconia, magnesia, spinel, mullite and silica; less than about 10% by weight carbon; from about 2% up to about 6% by weight of an oxidizable metal; and about 1% to 8% by weight of one or more permeability reducers selected from the group consisting of boron containing compounds and other glass formers and reactive silica, wherein, when said shape is heated to a temperature above about 1000° C., said refractory shape is adapted to form a dense, carbon free surface layer and having a carbon bonded structure underlying said surface layer.

7. A refractory shape having a composition consisting essentially of in weight %:

| Refractory oxide | 65–75% |
|---|---|
| Reactive silica | 1–3% |
| Boron compound | 2–5% |
| Oxidizable metal | 2–5% |
| Carbon | 4–10% |
| Incidental impurities | Balance, | said shape being adapted, when heated to about 1200° C. in air, to form a carbon free, sintered layer along an exposed surface thereof forming a barrier to gas penetration.

8. The refractory shape of claim 7 wherein said shape is a submerged pouring tube for use in the continuous casting of steel.

9. The refractory shape of claim 7 wherein said shape is a nose portion of a stopper rod for use in the continuous casting of steel.

10. The refractory shape of claim 7 wherein said shape is a one-piece slide gate plate and pouring tube for use in continuously casting steel.

11. The refractory shape of claim 7 wherein the said shape is one of an inner nozzle and nozzle plate for a tundish for use in the continuous casting of steel.

12. A method for making a refractory shape having a dense, carbon free layer thereon, comprising the steps of:

a) providing a refractory mix containing more than about 65% by weight of one or more refractory oxides, less than about 10% by weight carbon and an effective amount of permeability reducers to increase a rate of densification of said refractory oxides during a heating step;

b) pressing the mix to form a pressed shape having at least a selected surface formed of said refractory mix; and c) heating said pressed shape to oxidize said selected surface to render said surface porous and carbon free and further heating to densify said porous, carbon free surface, to finally render said surface dense and impervious to gases.

13. The method of claim 12 including coking said pressed shape at a temperature of about 800°–1000° C. to form a carbon bond phase in said refractory shape.

14. The method of claim 13 wherein said coking step causes said surface to oxidize and wherein said further heating at a temperature of about 1200° C. causes said oxidized, porous surface to densify.

15. A method of making a refractory shape for use in handling molten steel comprising the steps of:

a) providing a refractory mix consisting essentially of in weight %:

|                      |          |
|----------------------|----------|
| Refractory oxide     | 65–75%   |
| Reactive silica      | 1–3%     |
| Boron compound       | 2–5%     |
| Oxidizable metal     | 2–5%     |
| Carbon               | 4–10%    |
| Incidental impurities| Balance, | b) forming the mix to produce a shape;

c) coking the shape at a temperature of about 800°–1000° C. to form a carbon bonded structure in the shape;

d) heating the coked shape at a temperature of about 1000°–1400° C. for oxidizing the carbon along exposed surfaces of said shape and forming a porous, carbon free layer and for then densifying the porous, carbon free layer to form a dense, carbon free layer on the exposed surface overlying said carbon bonded structure.

16. The method of claim 15 wherein the shape is a submerged pouring tube for use in continuous casting.

17. The method of claim 15 wherein the shape is a nose portion of a stopper rod.

18. The method of claim 15 wherein said shape is a one-piece slide gate plate and pouring tube for use in continuously casting steel.

19. The method of claim 15 wherein the shape is one selected from the group consisting of an inner nozzle for a tundish and a nozzle plate for a tundish.

20. The method of claim 19 wherein the heating step is conducted at a temperature of about 1200° C.

21. The refractory shape of claim 1 in the form of a submerged pouring tube for use in casting steel wherein said selected surface includes all surfaces of said nozzle including surfaces of a slagline sleeve surrounding an outer peripheral area of said pouring tube.

22. The submerged pouring tube of claim 21 wherein a body portion of said nozzle is made from one or more refractory oxides comprising predominantly alumina and wherein the carbon is substantially graphite and wherein said slagline sleeve portion is made from refractory oxide comprising predominantly zirconia.

23. The pressed refractory shape of claim 6 in the form of a pouring tube for use in the continuous casting of steel, said tube comprising an elongated body portion having an axial bore therethrough and an integral slagline sleeve portion surrounding an outer peripheral area of said body, said body portion including alumina as a predominate refractory oxide and said slagline sleeve portion including zirconia as a predominant refractory oxide in said slagline sleeve.

24. The submerged pouring tube of claim 8 including a slagline sleeve surrounding an outer periphery of said tube, said slagline sleeve having a composition including zirconia as a predominate refractory oxide and wherein the carbon is substantially graphite, said slagline sleeve also being adapted to form a carbon free, densified outer layer when heated to about 1200° C. in air.

25. A submerged pouring tube for use in the continuous casting of steel, said tube comprising a pressed refractory body having an axial bore for the passage of liquid steel therethrough, said pouring tube also including a refractory slagline sleeve portion copressed with the body and surrounding an outer periphery of said body, said body and slagline sleeve being co-pressed from respective refractory mixes comprising in weight %:

|                  |         |
|------------------|---------|
| refractory oxide | 65–75%  |
| reactive silica  | 1–3%    |
| boron compound   | 2–5%    |
| oxidizable metal | 2–5%    |
| carbon/graphite  | 4–10%,  | and wherein the refractory oxide in the respective refractory mix for said body is alumina and the refractory oxide in the respective refractory mix for said slagline sleeve is zirconia and wherein said pouring tube, when preheated to about 1200° C. in air prior to service, is adapted to form a carbon free, densified layer along surfaces of said body, bore and slagline sleeve thereof forming a barrier to gas penetration.

* * * * *

UNITED STATES PATENT AND TRADEMARK OFFICE
CERTIFICATE OF CORRECTION

PATENT NO. : 5,681,499
DATED : October 28, 1997
INVENTOR(S) : Paul M. Benson et al.

Page 1 of 2

It is certified that error appears in the above-identified patent and that said Letters Patent is hereby corrected as shown below:

Title Page, under [56] References Cited, U.S. PATENT DOCUMENTS, first patent listed, "Wanatabe" should read --Watanabe--.

Title Page, insert --[30] Foreign Application Priority Data
    June 15, 1995 [FR]   France   94 07413
    Nov. 28, 1994 [FR]   France   94 14337--.

Title Page, under [57] ABSTRACT, Line 11, "mount" should read --amount--.

Column 1 Line 60 "now" should read --flow--.

Column 6 Line 21 "very free" should read --very fine--.

Column 6 Line 26 after "temperatures" hyphen should be dash (--).

Column 6 Line 43 "10000°" should read --1000°--.

Column 7 Line 62 "line 20" should read --liner 20--.

Column 9 Line 39, row beginning "Zirconia": "($ZrO_2.(3Al_2O_3.2SiO_2)$)" should read --($ZrO_2 \bullet (3Al_2O_3 \bullet 2SiO_2)$)--.

Column 10 Line 19, Table 1 Column 1, "($ZrO_2.(3Al_2O_3.2SiO_2)$)" should read --($ZrO_2 \bullet (3Al_2O_3 \bullet 2SiO_2)$)--.

UNITED STATES PATENT AND TRADEMARK OFFICE
CERTIFICATE OF CORRECTION

PATENT NO. : 5,681,499
DATED : October 28, 1997
INVENTOR(S) : Paul M. Benson et al.

It is certified that error appears in the above-identified patent and that said Letters Patent is hereby corrected as shown below:

Claim 24 Column 16 Line 26 "densifled" should read --densified--.

Claim 25 Column 16 Line 48 "densifled" should read --densified--.

Signed and Sealed this

Fourth Day of August, 1998

Attest:

Attesting Officer

BRUCE LEHMAN

Commissioner of Patents and Trademarks